ADAPTIVE MEAN-SQUARE EQUALIZER FOR DATA TRANSMISSION

Filed Jan. 23, 1968

INVENTORS E. R. KRETZMER
E. PORT
H. R. RUDIN, JR.
BY J. P. Kearns
ATTORNEY 3,508,172

ADAPTIVE MEAN-SQUARE EQUALIZER FOR DATA TRANSMISSION

Ernest R. Kretzmer, Holmdel, N.J., Erich Port, Zurich, Switzerland, and Harry R. Rudin, Jr., Lincroft, N.J., assignors to Bell Telephone Laboratories, Incorporated, Murray Hill and Berkeley Heights, N.J., a corporation of New York Filed Jan. 23, 1968, Ser. No. 699,953
Int. Cl. H04b *3/04, 3/06, 3/14*
U.S. Cl. 333—18 8 Claims

ABSTRACT OF THE DISCLOSURE

The automatic mean-square transversal filter equalizer is made adaptive to time variations in the frequency-response characteristics of a transmission medium during actual message transmission. A pseudo-random word test signal generated continuously during transmission of a message, which may be either digital or analog in nature, is readily separated from the message signal at a receiver by correlating the total received signal with an identical pseudo-random word generated at the receiver. The receiver-generated word, after passing through a filter having the frequency-response characteristic desired for the transmission medium, is synchronized with the transmitted word in a known fashion. The message, being nonperiodic, does not contribute to the correlation process and is detected conventionally. The correlation results, varying slowly in time from word to word, are made blind to the presence of the message signal by inserting a long period of delay in the control loop of the equalizer.

FIELD OF THE INVENTION

This invention relates generally to the correction of the distorting effects caused by transmission channels of limited frequency bandwidth on either analog or digital information signals and specifically to the adaptive correction of such distorting effects during information signal transmission.

BACKGROUND OF THE INVENTION

The restriction imposed by linear distortion on the flow of information in a communication channel is well known. In the past, the effects of this distortion have been alleviated through the use of manually adjusted equalizing or compensating networks. The adjustment of these networks is too cumbersome a process, however, for the user of a switched communication service to perform each time a new connection is established. Therefore, in present switched telephone and telegraph networks, control of linear distortion is imposed only on the individual links. Variation between links and variation of the number of links in tandem result in channels with distributed performance. Lower distortion can be achieved by equalizing the overall connection.

Automatic linear distortion removal or equalization has recently been made practical for synchronous digital data communication systems by the use of transversal filters as is disclosed in United States Patent No. 3,292,110 issued on Dec. 13, 1966 to F. K. Becker, R. W. Lucky and E. Port and entitled "Transversal Equalizer for Digital Transmission Systems Wherein Polarity of Time-spaced Portions of Output Signal Controls Corresponding Multiplier Setting." According to the teachings of this patent, equalization is accomplished prior to message data transmission by an iterative correlation process using a train of test pulses with the result that the channel impulse response is equalized at discrete sampling instants.

This preset equalization process has been more recently generalized so that automatic equalization can be provided for a communication channel independent of the signal format used in that channel, i.e., for nonsynchronous messages. The generalized system is disclosed in the copending joint patent application of F. K. Becker, L. N. Holzman, E. Port and H. R. Rudin, Jr., Ser. No. 595,885, filed Nov. 21, 1966 and entitled "Automatic Mean-Square Equalizer," now U.S. Patent 3,403,340, issued Sept. 24, 1968. This same generalized system is further described and analyzed in an article by R. W. Lucky and H. R. Rudin, published in the Bell System Technical Journal of November 1967 (Vol. XLVI, No. 9 at pages 2179 through 2208) and entitled "An Automatic Equalizer for General-Purpose Communication Channels."

According to the cited Becker et al. patent application and Journal article, a transversal filter with time-spaced tap attenuators is adjusted prior to message transmission to equalize the frequency response of a distorting transmission channel by comparing the responses of the channel and a reference filter having a specified response to identical pseudo-random test words generated respectively at the transmitting and receiving terminals of the channel. The difference signal resulting from this comparison is in turn correlated with time-spaced samples of the test signal traversing the equalizer to provide control signals for the respective tap attnuators or multipliers. If the channel response characteristic is time invariant, the attenuators will settle down to optimum values which cause the compensated channel response characteristic to match closely the specified response characteristic of the reference filter. The pseudo-random word generators are then taken out of the transmission circuit to permit the transmission of information signals.

Adaptive equalizers for digital transmission systems have been disclosed in copending patent applications of R. W. Lucky. In his application Ser. No. 460,794 filed June 2, 1965, now U.S. Patent 3,368,168, issued Feb. 6, 1968, and entitled "Adaptive Equalizer for Digital Transmission Systems Having Means to Correlate Present Error Components with Past, Present and Future Received Data Bits," an adaptive transversal filter equalizer for binary baseband data is disclosed. In his application Ser. No. 483,129 filed Aug. 27, 1965, now U.S. Patent 3,414,819, issued Dec. 3, 1968, and entitled "Digital Adaptive Equalizer System," an adaptive transversal filter equalizer for multilevel baseband digital data is disclosed. In both these applications the impulse response of the distorting channel is equalized only at synchronous sampling instants. Only digital data signals at a particular synchronous transmission rate can be thus equalized. The frequency response of the distorting channel is not thereby equalized in a way that permits the transmission of message waves of nonsynchronous or analog format.

It is an object of this invention to improve the automatic mean-square equalizer to permit its continued use during message transmission on transmission channels whose response characteristics vary with time.

It is another object of this invention to equalize a communication channel independently of the information transmission format.

It is a further object of this invention to equalize adaptively and continuously distorting transmission channels for both analog and digital information signals, whether synchronous or nonsynchronous.

SUMMARY OF THE INVENTION

The above and other objects of this invention are realized by continuing to generate pseudo-random word test signals after initial adjustment of the transversal equalizer, as disclosed in the cited F. K. Becker et al. application and Journal article, has been accomplished and by superimposing the information signal on the transmitter-generated word. The equalizer control signal now no longer comprises only the difference or error signal resulting from the comparison of the respective transmitter- and receiver-generated words, but also includes the information signal superimposed on an error signal. After initial equalization has been accomplished with or without the presence of the information signal, the residual component, i.e., the difference between the two random-word test signals required for correlation with the time-spaced received signal samples in the equalizer, will be sufficiently small in magnitude not to corrupt the information-bearing component. Therefore, the information signal is recoverable by conventional means connected to the output of the difference amplifier instead of the output of the summing amplifier, which is part of the equalizer itself.

The error component necessary for control of the equalizer attenuators is now separated from the information component by delaying the output of the difference amplifier by one or more pseudo-random word periods. The error component changes slowly with respect to the pseudo-random word period, while the information signal is in general aperiodic. Therefore, there will be little, if any, correlation between the delayed information signal and the samples presently appearing at taps on the equalizer. However, there will continue to exist substantially the same degree of correlation between the error component as such and the test signal samples at the equalizer taps as there would be in the absence of the information signal. The tap attenuators can thus respond adaptively to any slow time variations in the channel response characteristic.

It is a feature of this invention that the preset automatic equalizer can be made adaptive for general communications purposes by (1) superimposing on the transmitted periodic test signal an information signal of arbitrary format; (2) canceling the transmitted test signal from the output of the equalizer by subtracting therefrom a receiver-generated matching test signal while retaining the information signal; and (3) delaying the difference signal by a multiple of the test signal period to blind the equalizer control circuits to the presence of the information signal.

DESCRIPTION OF THE DRAWING

This invention will be more fully appreciated from a consideration of the following detailed description and the drawing in which.

DETAILED DESCRIPTION

Figures 1, 2:
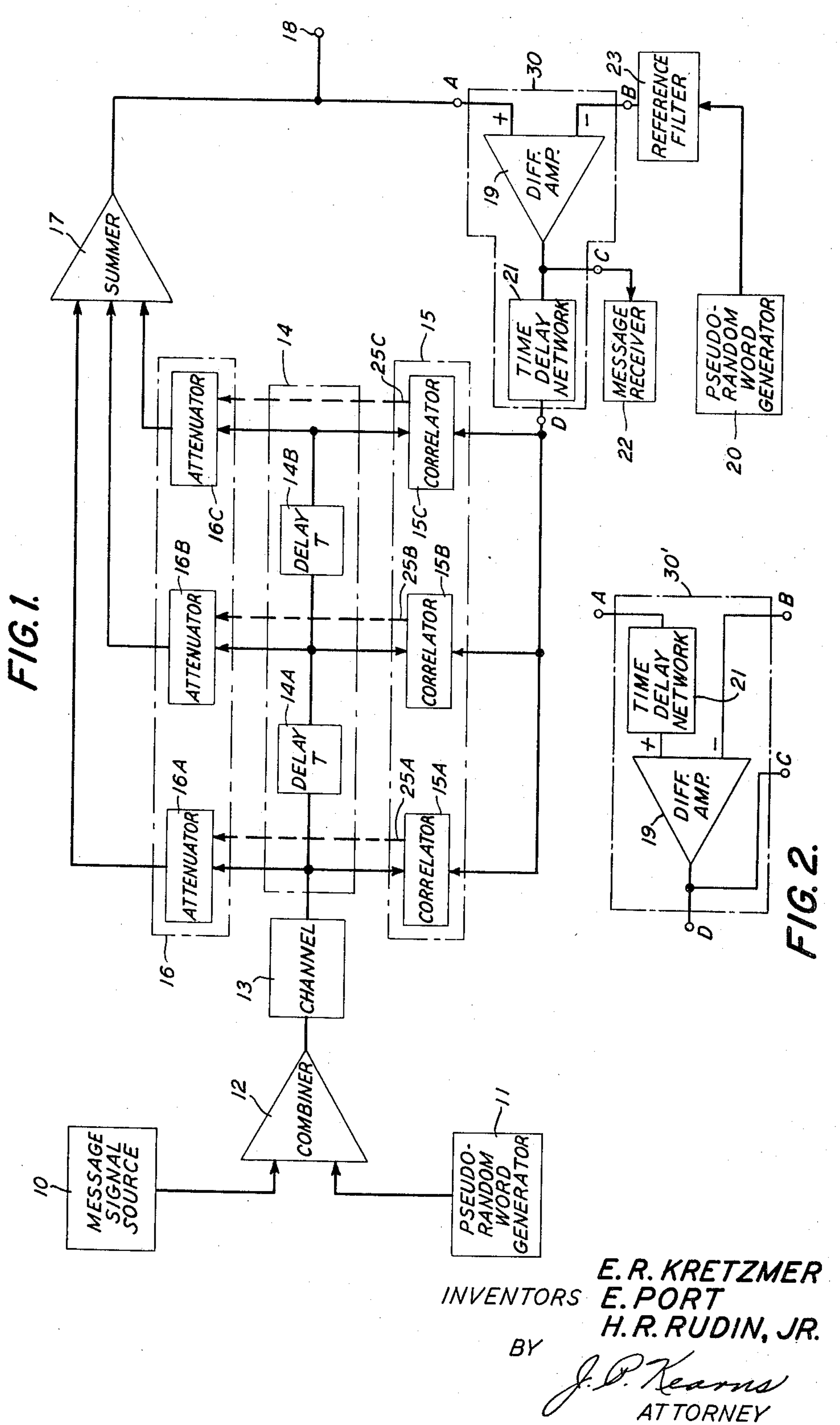
FIG. 1 is a block schematic diagram of a data transmission system including a mean-square equalizer modified in accordance with this invention to be adaptively and continuously adjustable during message transmission.
FIG. 2 is a block schematic diagram of an alternative arrangement of delay and difference amplifier elements in the equalizer of FIG. 1.

In FIG. 1 of the drawing there is depicted a baseband data transmission system including a mean-square automatic equalizer modified according to this invention to operate continuously and adaptively during message transmission. The mean-square equalizer disclosed in the cited Becker et al. patent application operates at carrier passband before demodulation. The present disclosure omits consideration of the ancillary techniques of error weighting, carrier-frequency offset compensation, carrier phase-shift correction, and translation of message and test signals to and from a carrier passband in order to simplify the drawing and focus directly on the present inventive improvements. These techniques are set forth in detail in the cited Becker et al. patent application and in the Journal article. However, it will be understood that the principles of this invention are applicable to both baseband and carrier passband communication systems.

The preset automatic mean-square equalizer, as implemented for baseband operation, comprises a first pseudo-random word generator 11 at the transmitting end of a transmission channel 13; a matching second pseudo-random word generator 20 at the receiving end of the same transmission channel; and also at the receiving end a tapped delay line 14, an adjustable attenuator 16 connected to each such tap on the delay line, a summing amplifier 17 combining the outputs of attenuators 16, a correlator 15 connected to the delay line 14 for control of the corresponding attenuators 16, a reference filter 23 connected to the output of second word generator 20, a difference amplifier 19 having as inputs the respective outputs of summing amplifier 17 and reference filter 23 and as output the error deviation in the respective responses of the channel and equalizer to the output of the first word generator and of the reference filter to the output of the second word generator. It will be assumed that the first and second word generators are brought into synchronism by a cross-correlation of their respective outputs by servo loop methods as disclosed in the cited Becker et al. patent application. It will further be understood that delay line 14 may be provided with additional taps to improve the precision of the equalization fit.

The preset automatic mean-square channel equalizer functions in such a fashion that the total mean-square error resulting both from linear distortion and random noise on the transmission channel is minimized. By the mean-square error is meant the integral of the square of the difference between the channel and reference filter frequency characteristics, as is defined more precisely in Equations 1 through 6 of the Becker et al. application and on pages 2181 through 2189 of the Journal article. In terms of the specific embodiment shown in the drawing the error deviation in the output of difference amplifier 19 is correlated with each individual delay line tap output in a correlator multiplier 15 to generate control signals on leads 25 which slowly adjust attenuators 16 until these control signals reach substantially zero voltage.

In the preset equalizer the pseudo-random word test signals are generated for a period of time required to bring all the attenuator control signals to substantially zero prior to message transmission. A pseudo-random word generator generates repetitive word patterns composed of binary bits which appear to be random within the period of each word extending over a large number bit intervals but which are identical from word to word. The pseudo-random word generators in the preset equalizer are removed from the circuit after initial equalization and the attenuator settings are left undisturbed. A message signal source 10 is connected to the transmitting end of channel 13 in place of word generator 11 and a message receiver 22 is connected to the output of summing amplifier 17, as at terminal 18. Reference filter 23, difference amplifier 19 and correlators 25 are not required during message transmission over a time-invariant channel.

For adaptive equalization word generators 11 and 20 are retained in operation after initial equalization. Reference filter 23, difference amplifier 19 and correlators 15 also remain in the circuit. These significant modifications are made in the overall equalizer arrangement in converting from preset to adaptive operation. Message signal source 10, in a first modification, is connected to the input of channel 13 in parallel with first pseudo-random word generator 11 through linear combiner 12, which may be a pair of isolating resistors or a summing amplifier. When the equalizer is to be used for both initial and adaptive equalization, message receiver 22 is not connected to the output of equalizer summing amplifier 17 at terminal 18 but rather to the output of difference amplifier 19, as a second modification. The information-bearing signal from source 10, it came to be realized, appears not only in the output of summing amplifier 17 but in the output of difference amplifier 19 as well, when superimposed on the transmitted word test signal. To difference amplifier 19, the information-bearing signal appears only as high-level noise and has negligible effect on the synchronization between transmitter and receiver test signal words achieved during initial operation. To message receiver 22, on the other hand, as long as the error difference between the two test signals is small, the error signal appears only as low-level noise and no unusual difficulties in reconstructing the information-bearing signal are encountered. Therefore, no modification of a conventional message receiver itself is required.

If the uncompensated error signal with the superimposed information signal is applied to correlators 15, however, the results are self-defeating. In attempting to minimize the signal at the output of difference amplifier 19 with respect to the outputs of each individual tap on delay line 14, attenuators 16 tend to be run up to their maximum levels. This result is due to the fact of the overpowering correlation between the equalized information signal component in the output of the difference amplifier and the unequalized information signal component appearing at the delay line taps. True equalization would be clearly impossible in this circumstance.

However, it has been discovered that correlators 15 can be effectively blinded to the information-bearing signal portion of the total signal in the output of difference amplifier 19 by a deceptively simple expedient. One means of achieving the necessary independence of the equalizer from its noisy environment involves the insertion, as a third modification, of a long delay interval between the output of difference amplifier 19 and the input to correlators 15, as indicated by block 21 designated "time delay network." The delay of network 21 is established as the length of the pseudo-random test-signal word or a multiple thereof. As a result of this long delay, correlators 15 can no longer detect correlation between the "noise" samples on delay line 14 and the "noise" samples appearing in the output of difference amplifier 19. The "noise" is mainly the information-bearing signal portion which is relatively random over the period of a test word and between test words. The only requirement is that the length of the test word, and consequently the delay of network 21, be longer than the impulse response time of the channel. This latter requirement is met without difficulty.

On the other hand, because the time delay of network 21 is precisely that of the test word repetition period, the correlation between the distorted test signals at the taps of delay line 14 and the true error signals, i.e., difference between transmitter and receiver test words, is unaffected. The effects of the "noise" upon the accuracy of the correlation products can be made arbitrarily small by picking the integration time constants of correlators 15 sufficiently large.

Time delay network 21 may also be connected in the output of summing amplifier 17 with equal effect, as shown in FIG. 2. The section of FIG. 1 enclosed in broken-line box 30 has terminals A, B, C, and D and internally comprises difference amplifier 19 and time-delay network 21 connected to its output. FIG. 2 shows broken-line box 30' having identical terminals A, B, C and D in the same relative positions as the corresponding terminals in block 30 of FIG. 1. Inside block 30' the position of difference amplifier 19 and time-delay network 21 with respect to each other are reversed so that terminal A provides a connection from the output of summer 17 in FIG. 1 directly to the input of network 21 instead of to the positive input terminal of amplifier 19, the output of network 21 is internally connected to the positive input of amplifier 19, terminal B remains unchanged in its connection to the negative input of amplifier 19 and terminals C and D merge to connect the output of amplifier 19 to both message receiver 22 and correlators 15 of FIG. 1. Box 30' of FIG. 2 is fully interchangeable with, and functionally the same as, box 30 of FIG. 1.

The long delay required for network 21 can be obtained precisely in analog fashion only with difficulty. However, the use of multistage digital shift registers for network 21 is straightforward and is the preferable alternative. The required techniques for the implied analog-to-digital conversion are well known.

In summary, a technique for providing adaptive equalization of time-varying communication channels has been disclosed. A known test signal is transmitted at a level below that of a simultaneously transmitted information signal of arbitrary type or format in such a way that neither signal corrupts the other. The transmitted test signal is removed from the received signal by a receiver-generated matching test signal that has been passed through a substantially ideal reference filter to leave a residue which is an index of the real-channel distortion. This residue has no significant effect on the information signal portion of the total received signal. At the same time an equalizer adjustment mechanism is blinded to the information signal by delaying the received signal a fixed amount determined by the period of a repetitive test signal.

While this invention has been disclosed in terms of a specific embodiment, its principles are susceptible of wide application by those skilled in the art to which it relates.

What is claimed is:

1. The combination with a distorting transmission channel and a transversal equalizer having a plurality of attenuators at spaced taps therealong automatically adjustable under the control of an error signal derived in a difference amplifier by subtracting the respective response of such channel and equalizer in cascade and of a reference shaping filter to identical pseudo-random word test signals of predetermined equal lengths generated at respective transmitting and receiving terminals of such channel of means rendering said equalizer continuously and adaptively adjustable during message transmission over said channel comprising a message signal source connected in parallel, and operating simultaneously, with a test signal source at the transmitting terminal of said channel, a message utilization sink connected directly to the output of said difference amplifier at the receiving terminal of said channel where said test signals tend to cancel each other and produce said error signal, and a delay circuit having a delay equal to one or more of said word lengths interposed between the output of said equalizer and said attenuators for effectively separating the message signal in the output of said difference amplifier from said error signal.

2. The combination according to claim 1 in which said delay circuit comprises one or more multistage shift registers.

3. The combination according to claim 1 in which said delay circuit is connected between the output of said equalizer and an input of said difference amplifier.

4. The combination according to claim 1 in which said delay circuit is connected between the output of said difference amplifier and said attenuators.

5. Apparatus for maintaining during message transmission optimum settings in a transversal equalizer initially adjusted to impart a desired frequency response characteristic to a distorting transmission channel comprising means at respective transmitter and receiver terminals of said channel generating identical repetitive pseudo-random word patterns as test signals, means at the transmitter terminal superimposing a message signal wave on the test signal generated thereat, reference filter means at the receiver terminal having the desired frequency response characteristic shaping the test signal generated thereat, adjustable attenuators at time-spaced taps on the transversal equalizer at said receiver terminal, summation means for the outputs of said attenuators, a difference amplifier at said receiver terminal subtracting the output of said reference filter means from the output of said summation means to cancel substantially the test signal components in the output of said summation means leaving an error component for control of said attenuators and a superimposed message wave component, a message receiver at the output of said difference amplifier for recovery of said message wave component in the presence of said error component, correlator means at each tap on said transversal equalizer obtaining control signals for said attenuators from said error component, and delay means bridging the output of said difference amplifier to said correlator means having a delay period equal to one or more test signal periods for removing the effect of said message wave component in the output of said difference amplifier on the operation of said correlator means.

6. In combination with a distorting transmission channel and a transversal equilizer in tandem connection, means additively combining a message signal of arbitrary format with a first synchronous repetitive test signal to provide a composite signal for application to said channel and equalizer, reference filter means having a predetermined frequency characteristic, means subtractively combining the composite signal from said channel and equalizer with a second repetitive test signal synchronized with and matching said first test signal and shaped by said reference filter means to provide a control signal for said equalizer, and means delaying said composite signal from said equalizer by one or more repetition periods of said test signals to remove substantially any correlation between the message signal component superimposed on said control signal and that traversing said equalizer.

7. The method of maintaining during message transmission optimum adjustment of a transversal equalizer initially adjusted to impart a desired frequency response characteristic to a distorting transmission channel comprising the steps of (a) additively combining a message signal of arbitrary format with a first synchronous repetitive test signal word to produce a composite signal for application to said channel in tandem connection with said equalizer, (b) delaying the composite signal from said equalizer by one or more repetition periods of said first test signal word, (c) generating a second repetitive test signal word synchronized with and matching said first test signal word in period and pattern, (d) shaping said second test signal word to said desired frequency response characteristic, and (e) subtractively combining the shaped second test signal word with the delayed composite signal to obtain an adaptive control signal for said equalizer.

8. The method of maintaining during message transmission optimum adjustment of a transversal equalizer initially adjusted to impart a desired frequency response characteristic to a distorting transmission channel comprising the steps of (a) additively combining a message signal of arbitrary format with a first synchronous repetitive test signal word to produce a composite signal for application to said channel in tandem connection with said equalizer, (b) generating a second repetitive test signal word synchronized with and matching said first test signal word in period and pattern, (c) shaping said second test signal word to said desired frequency response characteristic, (d) subtractively combining the shaped second test signal word with said composite signal to form an error signal with a message signal component superimposed thereon, and (e) delaying said error signal by one or more repetition periods of said test signal words to obtain an adaptive control signal for said equalizer blinded to the presence of said message signal component.

References Cited

UNITED STATES PATENTS

| | | | |
|---|---|---|---|
| 3,283,063 | 11/1966 | Kawashima et al. | 333—28 XR |
| 3,375,473 | 3/1968 | Lucky | 333—18 |
| 3,403,340 | 9/1968 | Becker et al. | 325—42 |

HERMAN KARL SAALBACH, Primary Examiner

M. NUSSBAUM, Assistant Examiner

U.S. Cl. X.R.

333—28, 70